United States Patent

[11] 3,617,646

[72] Inventor Dieter J. H. Knollman
Matawan, N.J.
[21] Appl. No. 843,326
[22] Filed July 22, 1969
[45] Patented Nov. 2, 1971
[73] Assignee Bell Telephone Laboratories, Incorporated
Murray Hill, N.J.

[54] MULTIFREQUENCY OSCILLATOR EMPLOYING SOLID-STATE DEVICE SWITCHING FOR FREQUENCY SELECTION
5 Claims, 4 Drawing Figs.

[52] U.S. Cl. ........................................................ 179/90 K
[51] Int. Cl. ........................................................ H04m 1/50
[50] Field of Search ........................................... 179/90 K, 90 B, 90 BD, 2 DP; 331/177, 179, 181

[56] References Cited

UNITED STATES PATENTS

| | | | |
|---|---|---|---|
| 3,515,814 | 6/1970 | Morgan ........................ | 179/2 |
| 3,440,357 | 4/1969 | Broekhuysen ................ | 179/90 |
| 3,441,685 | 4/1969 | Wallace ........................ | 179/90 |

*Primary Examiner*—Kathleen H. Claffy
*Assistant Examiner*—Tom D'Amico
*Attorneys*—R. J. Guenther and Edwin B. Cave

ABSTRACT: Signal frequency combinations in a multifrequency signal generator are produced selectively by establishing conductive paths through switched transistors to connect respective frequency-determining elements into the oscillator circuits.

INVENTOR
D. J. H. KNOLLMAN
BY [signature]
ATTORNEY

MULTIFREQUENCY OSCILLATOR EMPLOYING SOLID-STATE DEVICE SWITCHING FOR FREQUENCY SELECTION

BACKGROUND OF THE INVENTION

1. Field of the Invention

This invention relates to multifrequency signal generators and, more particularly, to signal generator systems that include means for selectively producing coincident pairs of diverse-frequency, oscillatory signal bursts.

2. Description of the Prior Art

Multifrequency signal generators with the capability of producing unique coincident pairs of oscillatory signal bursts in response to an input signal, or in response to the actuation of a switch or the like, are well known, as disclosed for example by L. A. Meacham and F. West in U.S. Pat. No. 3,184,554, issued May 18, 1965. One form of the arrangement shown by Meacham and West is employed commercially as a pushbutton-operated dial for a telephone set. Each signal pair generated by the dial includes one signal from a relatively high-frequency band and one signal from a relatively low-frequency band, and each unique combination is indicative of a dialed digit in accordance with a frequency code.

With the advent of integrated circuitry and thin film techniques has come the realization that such modern circuit technology cannot readily be exploited in conventional multifrequency signal generators, owing in part to still existing requirements for conventional mechanical switching. The present commercial, pushbutton-operated telephone dials employ mechanical contacts as frequency switches to tune the tank circuits of the oscillator. When the conventional pushbutton switches are closed, there is negligible contact wiping action and very little voltage or current exists in the oscillator tank circuit. As a result, contact films that may have been formed are not likely to be fully broken down at the time of switch operation, and consequently, the contact resistance of the switches on occasion becomes excessively large and adversely affects the performance of the dial signal generator. Another problem which stems from the use of mechanical frequency determining switches is the creation of switching transients and noise that cause spurious or distorted signals.

Accordingly, a broad object of the invention is to isolate the oscillator circuit of a multifrequency signal generator from the adverse effects of mechanical frequency selection switches.

SUMMARY OF THE INVENTION

This object and additional objects are achieved in accordance with the principles of the invention by employing solid-state switching devices such as transistors, for example, to tune the tank circuits of a multifrequency oscillator. The transistor switches may in turn be operated by mechanical switches or by input signals from another source. In either case, an arrangement in accordance with the invention avoids the disadvantages inherent in employing mechanical switches directly to tune the oscillator tank circuit. For example, the contact resistance of the mechanical switches is no longer a significant factor in the performance of the oscillator.

In accordance with the invention, it has been found that the tuning of the tank circuits with transistors does not effect the performance of the dial signal generator so long as certain basic requirements are satisfied. First, the ON resistance of the transistor must be substantially less than the resistance of the tuned winding of the tank circuit, and second, the OFF resistance of the transistor must be substantially greater than the impedance of the tank circuit at the tap at which the transistor switch is located. Oscillator tank circuits typically have high resonant impedances and, accordingly, the dominant factor in the selection of a transistor for an application in accordance with the invention is the OFF resistance.

In accordance with one feature of the invention, a multifrequency signal generator circuit employing transistor frequency selection switches is protected against the type of power dissipation that would otherwise be caused by sneak paths through the circuit by isolating high-frequency and low-frequency tank circuit groups.

In accordance with another feature of the invention, the shunting of loop current from the transmitter in the telephone set and the consequent loss in transmitting power are avoided by the employment of a circuit combination that provides dial signal generator excitation current only momentarily before dialing.

DETAILED DESCRIPTION

Figure 1:
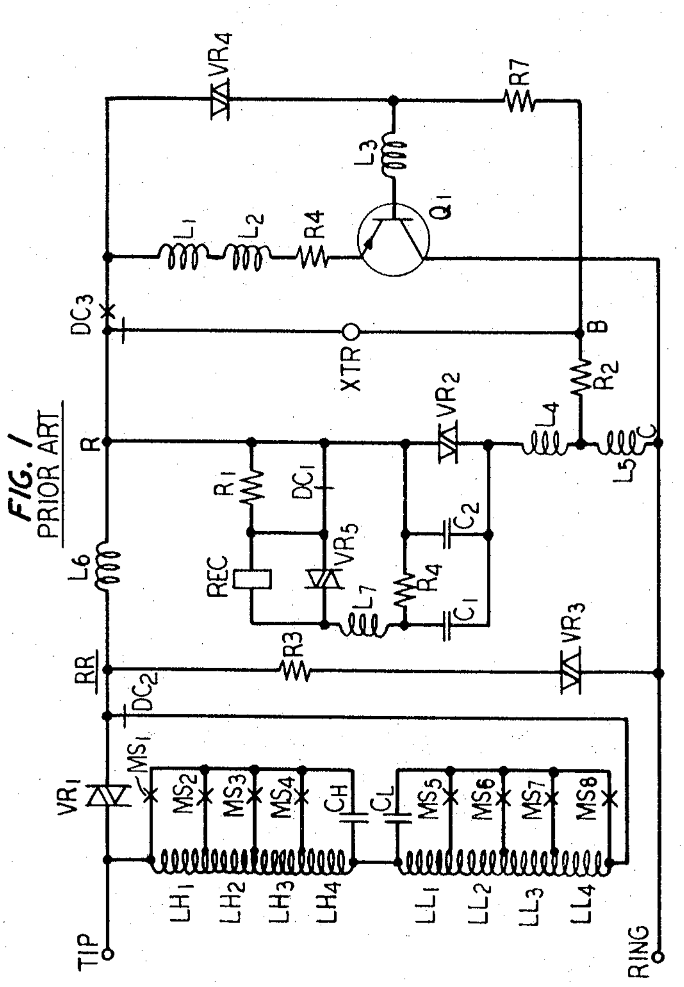
FIG. 1 PRIOR ART
FIG. 1 is a schematic circuit diagram of a conventional subscribers's telephone set employing a multifrequency dial signal generator operated entirely by mechanical switches.

Although the circuit shown in FIG. 1 is entirely within the prior art, a brief description thereof will serve as a useful preface to a detailed discussion of a circuit in accordance with the invention. In FIG. 1 the conventional elements of the speech network of a subscribers's telephone set are shown connected across the TIP and RING leads of a telephone line. These elements include a receiver REC and a transmitter XTR and associated circuit elements including the capacitors C1 and C2; the resistors R1, R2, R3 and R4; and the varistors VR2, VR3, VR4 and VR5; together with the inductive coils of the hybrid $L_4$, $L_5$, $L_6$ and $L_7$. The speech network described is included merely to illustrate one typical environment for a multifrequency dial signal generator in accordance with the invention and accordingly, no detailed discussion thereof is required.

Also conventional is the transistor-driven, multifrequency signal oscillator of FIG. 1 which employs a transistor Q1 as the active element. Included in the oscillator circuit are the inductors $L_1$, $L_2$ and $L_3$; the resistors R5 and R7; and the tuned circuits which include a first or high-frequency group utilizing a capacitor $C_H$ and inductors or coils $LH_1$ through $LH_4$, together with a second or low-frequency group which includes a capacitor $C_L$ and inductors or coils $LL_1$ through $LL_4$. In the operation of the mechanical switches $MS_1$ through $MS_8$, two switches, one in each of the two groups plus the dial common switch illustrated by the contacts $DC_1$ through $DC_4$, are normally operated substantially simultaneously in response to the manual depression of a single pushbutton on a conventional pushbutton-type telephone dial, not shown. As is well known, the dial signal generator apparatus illustrated in FIG. 1 normally produces two simultaneous oscillatory bursts—one from a relatively high-frequency band and one from a relatively low-frequency band, and each such combination is indicative of a dialed digit in accordance with a 3×4 or 4×4 frequency code.

Figure 2:
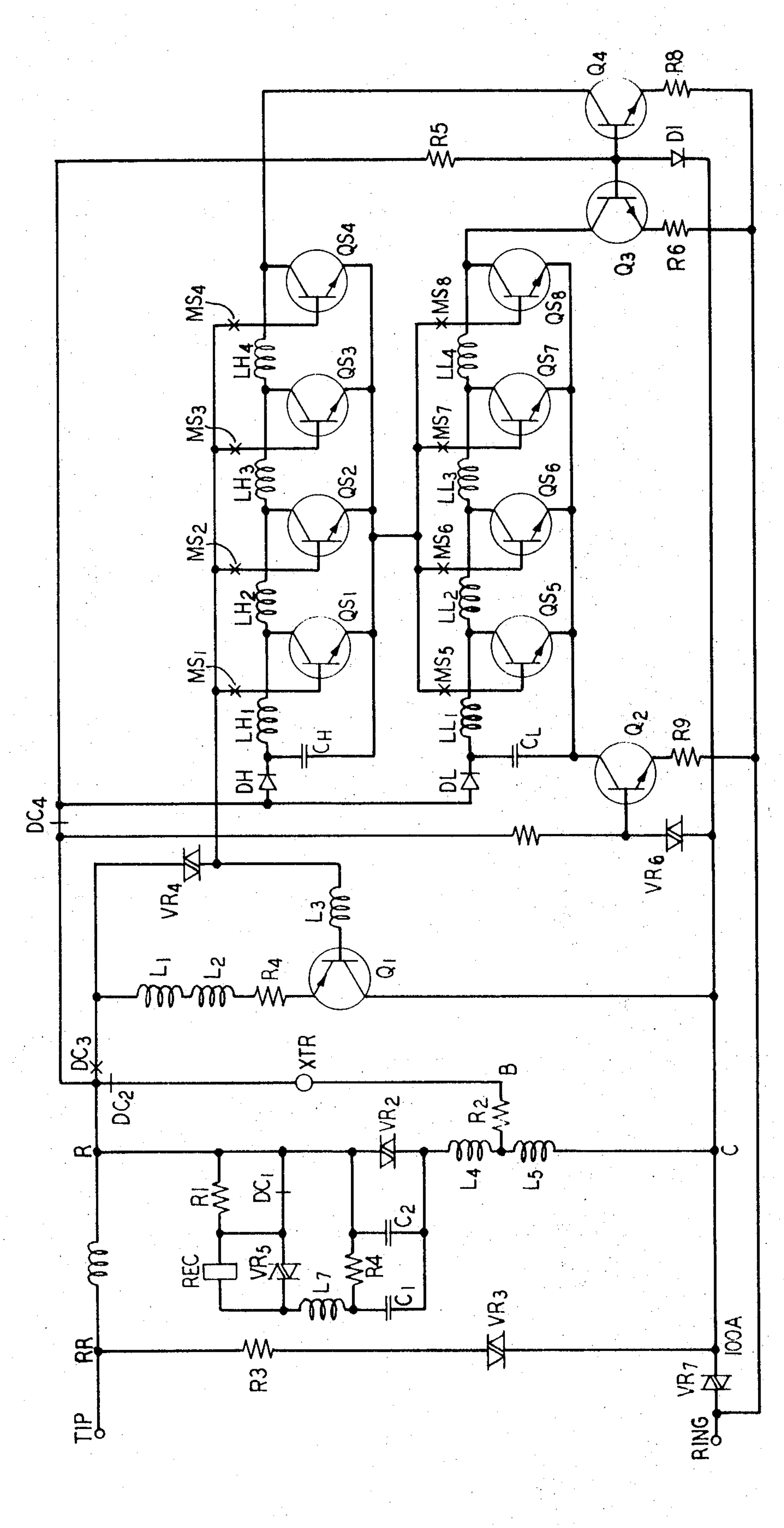
FIG. 2 is a schematic circuit diagram in accordance with the invention of a subscriber's telephone set employing a multifrequency dial signal generator operated by combinations of mechanical contacts and transistor switches.

Operating current for the transistor oscillator $Q_1$ is supplied by way of the make contact $DC_3$. In accordance with the invention, each of the mechanical frequency selection switches $MS_1$ through $MS_8$ shown in FIG. 1 is combined with a respective one of the frequency determining transistor switches $QS_1$ through $QS_8$, as shown in FIG. 2, in order to isolate the oscillator from the distortion products included by the operation of the mechanical switches. Some insight will be gained concerning the reasons for the particular configuration of the tuned circuit, transistor-switch combination shown in FIG. 2 by considering the pertinent transistor parameters affecting the design of a solid-state alternating current switch. As a first step in such a consideration, it can be shown that the ON resistance of a transistor switch is dependent upon $a_N$, $a_I$ and $\eta$, where $a_N$ is the normal transistor alpha, where $a_I$ is the inverted transistor alpha, and where $\eta$ is a constant between 1 and 2 depending upon the particular transistor type. Additionally, it is known that the ON resistance is at a minimum when each of the factors $a_N$, $a_I$ and $\eta$ is approximately equal to 1. The OFF resistance of a transistor switch is dependent almost entirely upon leakage currents. It is also known that a symmetrical transistor such as an alloy transistor, has a much greater inverse gain than a planar transistor and that $\eta$ has a value of 1 for germanium transistors and a value between 1 and 2 for silicon transistors. It would appear, therefore, that the minimum ON resistance might be achieved by employing a germanium alloy transistor. Other factors, however, must be taken into consideration.

The OFF-SET voltage is a minimum for $\eta \approx 1$ and $a_I \approx 1$ for a transistor in the common emitter configuration, and is a minimum if $\eta=1$ and $a_N \approx 1$ for a transistor in the common collector configuration. A germanium alloy transistor, when employed as a solid-state alternating current switch, would thus have the lowest OFF-SET voltage. In comparison, a silicon planar transistor has a low OFF-SET voltage in the common collector configuration and a high OFF-SET voltage in a common emitter configuration, since it has a high $a_N$ and a low $a_I$. Also, a minimum leakage current is achieved by using a silicon transistor as opposed to a germanium transistor.

Figure 4:
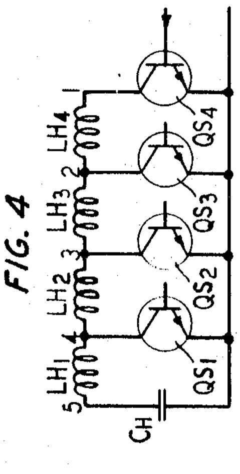
FIG. 4 is a schematic circuit diagram of a tuned circuit employing frequency-switching elements in accordance with the invention.

In accordance with the invention, it has been found that transistor switches may be used in combination with a multifrequency signal generator without affecting oscillator performance if the following requirements are satisfied. First, the ON resistance of the transistor should be much less than the resistance of the tuned winding of the tank circuit; and second, the OFF resistance of the transistor should be much greater than the impedance of the tank circuit at the tap at which the transistor is located. Inasmuch as the tank circuits of the oscillators in dial signal generators typically have high resonant impedances, the dominant factor in the selection of a transistor switch for the use indicated in FIG. 4 is the OFF resistance. As indicated above, if the OFF resistance is to be maximized, the use of a silicon planar transistor is desirable, and the common collector configuration is preferred to the common emitter configuration if the ON resistance is to be minimized at the expense of the OFF-SET voltage.

Insofar as leakage resistance is concerned, it has been found that its effect on a tank circuit may be determined by calculating the effective load placed across the entire tank by the leakage resistance of the OFF transistors. For such an analysis, transistors $QS_4$ connected to tap 1 in FIG. 4 may be considered turned ON, all of the others being OFF.

The average leakage resistance $R_L$ of an OFF transistor as a function of peak AC collector-to-emitter voltage $V_P$ and collector current $I_C$ may be expressed as follows:

$$R_L = \frac{\pi}{2} \frac{V_P}{I_C^+ + I_C^-} \qquad (1)$$

In the circuit shown in FIG. 4, $V_P$ varies with the tap of the coils $LH_1$–$LH_4$, although it is always less than some small voltage—such as 1.5 volts. The voltage across the 1–2 winding $LH_4$ is normally limited by a varistor to a level of about 0.6 volt, and the peak AC collector-to-emitter voltage across any of the transistors $QS_1$, $QS_2$ or $QS_3$ is less than $$V_P = TRV_{12} \qquad (2)$$

where $V_{12}$, the voltage across the $LH_4$ winding, is approximately 0.6 volt, and $TR$ is the turns ration to the winding tap points from the $LH_4$ winding.

The leakage resistance of a transistor $R_L$ is transformed to an equivalent resistance $R_t$ across the entire tank winding which may be expressed as follows:

$$R_T = \left(\frac{T_{12}}{TR}\right)^2 R_L, \qquad (3)$$

where $T_{12}$ is the turns ratio of the entire tank to the 1–2 or $LH_4$ winding. Using equation (1), equation (3) becomes $$R_T = \frac{T_{12}^2}{(TR)} \frac{\pi}{2} \frac{V_{12}}{I_C^+ + I_C^-}. \qquad (4)$$

The load $R_{TOTAL}$ across the tank, due to the leakage of the three OFF transistors, is the parallel combination of leakage resistances which may be expressed as follows:

$$R_{TOTAL} = T_{12}^2 \frac{\pi}{2} \frac{V_{12}}{I_C^+ + I_C^-} \frac{1}{(\Sigma TR)^2}. \qquad (5)$$

For one typical commercially available silicon planar transistor having junction temperatures of 60° C., maximum values of leakage currents are expressed as follows:

$$I_{EBO} \max = 4\ \mu a. \text{ at } V_{CE}=4 \text{ volts} \qquad (6)$$

$$I_{CEX} \max = 10\ \mu a. \text{ at } V_{CB}=10 \text{ volts} \qquad (7)$$

where $I_{CEX}$ is the collector-to-emitter leakage current with the base emitter junction forward biased by 0.4 volt. In employing such transistors in the circuit of FIG. 4, it has been found that with a junction voltage of 1.5 volts across the transistors, the base emitter leakage current $I_{EBO}$ is approximately 3.2 $\mu$a. and the collector-to-emitter leakage current $I_{CEX}$ is approximately 2.5 $\mu$a. With the base of the transistor open, the emitter junction leakage current is amplified by the transistor so that $$I_C^- = \frac{I_{EBO}}{1-a_I}. \qquad (8)$$

Assuming $a_I$=0.2, then $I_C{}^1{}_0$ becomes 4 $\mu$a. $I_C^+$ may be taken directly as $I_{CEX}$, or 2.5 $\mu$a.

The total load resistance $R_T$ across the tank of the oscillator may be computed with the following expression:

$$R_T = T_{12}^2 \frac{\pi}{2} \frac{V_{12}}{I_C^+ + I_C^-} \frac{1}{\Sigma(TR)^2} \qquad (9)$$

which, in an illustrative case, was computed to be $2.63 \times 10^6$ ohms.

It has been determined that negligible load is placed across the tank circuit of the oscillator if the total leakage resistance is much greater than the impedance of the tank circuit at resonance. This impedance is typically less than 200 kilohms for each of the two tank circuits commonly employed in a conventional telephone multifrequency dial signal generator. Since the "worst case" combined leakage resistance of three otherwise suitable silicon planar transistors of a common, commercially available type is $2.63 \times 10^6$ ohms with the transistor bases open, it is evident that such transistors may be employed without shunting the tank circuits and, accordingly, back-biasing the transistor junctions to decrease the leakage current is not required.

The ON resistance which appears as a series resistance has been found to be negligible for transistors connected in a tank circuit in the manner illustrated by FIG. 4. Moreover, such added resistance has little or no effect on frequency pulling between the two tanks circuits of a multifrequency oscillator. From the foregoing, therefore, it may be concluded that the utilization of transistor switches in the tank circuits of oscillators has little or no effect on oscillator performance.

The power required to operate a multifrequency dial signal generator of the type shown in FIG. 1 is normally supplied from the telephone line and one conventional arrangement is to use the power dissipated in a resistor in the oscillator circuit such as resistor R7 in FIG. 1 which supplies bias current to the oscillator transistor $Q_1$. If the resistor R7 is replaced by an impedance Z, the DC value of Z should be low enough to allow sufficient current to flow through the varistor VR4 to establish the base bias voltage for the transistor. Inasmuch as the resistor R7 effectively appears across the oscillator between the points C and R in the network, the AC value of Z should be relatively high in order to minimize the load on the oscillator.

A circuit utilizing a network in accordance with the invention to replace the resistor R7 of FIG. 1 is shown in FIG. 2. The oscillator tank circuits, which are in parallel relation, are arranged for transistor tuning and are connected in the collector circuit of a regulating transistor Q2. Transistor Q2 controls the level of direct current that passes through the transistor switches $QS_1$, $QS_2$, $QS_3$ and $QS_4$ in the high-frequency tank and through the transistor switches $QS_5$, $QS_6$, $QS_7$ and $QS_8$ in the low-frequency tank. This control is effected by limiting the voltage drop that occurs across the resistor R9. Transistor Q2 operates in the active region and thus ensures that a high AC impedance exists across the network. Resistor R9 fixes the collector current of transistor Q2 at a constant value which may be on the order of 3 ma. when the transistor tuning switches are ON. The varistor $VR_7$ of the regulating circuit is placed in series with the RING lead of the telephone line in order to obtain a higher input impedance.

For a long loop condition where a minimum current is passing through the varistors $VR_7$ and $VR_6$ , the input impedance is at a minimum and it has been noted that the load of the regulator circuit is slightly less than the load presented by resistor R7 in the circuit of FIG. 1.

Excitation current is required in each tank circuit to guarantee immediate full oscillatory output in the conventional dial 6 in FIG. 1. Excitation current flows through the windings of both tuned circuit groups when the station is off-hook and none of the mechanical frequency switches $MS_1$ through $MS_8$ are operated. The interruption of excitation current by a contact $DC_2$ on the common switch generates a large inductive voltage in the oscillator, thereby ensuring immediate full oscillatory output. An excitation circuit in accordance with the invention is included in the circuit shown in FIG. 2. Here, excitation current flows through both tanks in parallel. A typical level for the excitation current is on the order of 2.5 ma.

In the absence of another feature in accordance with the invention, the excitation circuit shown in FIG. 2 is not fully satisfactory in that it shunts loop current from the transmitter XTR in the telephone set. On long loops, almost the entire loop current passes through the transmitter. With the excitation circuit shown and with conventional operation of the dial common switch $DC_4$, however, the transmitter can lose as much as 5 ma. of current which corresponds to a 2-decibel loss in transmitter output.

In accordance with the invention, a solution to the loss in transmitter output is introduced by providing excitation only momentarily before dialing. This method requires a change in conventional timing of the contacts of the dial common switch. In the conventional dial, the frequency switches $MS_1$ through $MS_8$ of the tank circuits operate first and the excitation current contact $DC_4$ operates last. In the circuit of FIG. 2, however, excitation current is provided only during the time interval between the closing of the frequency switches and the opening of the excitation contacts. The sequence of switch operation is thus reversed so that, in each instance of dial operation, one of the mechanical frequency switches $MS_1$ through $MS_4$ operates substantially simultaneously with one of the switches $MS_5$ through $MS_8$ which is followed immediately by the operation of a corresponding pair of the transistor switches $QS_1$ through $QS_8$. Excitation current then flows momentarily before the operation of the dial common switch $DC_4$.

Operating circuit paths for the parallel tank circuits shown in FIG. 2 are completed by transistor $Q_3$ which has its collector electrode connected to the collector electrode of transistor switch $QS_8$ and its emitter connected to the RING lead by way of a resistor R6. Similarly, a second transistor $Q_4$ has its collector electrode connected to the collector of transistor switch $QS_4$ and its emitter electrode connected to the RING lead by way of a resistor R8. Transistors $Q_3$ and $Q_4$ provide the high isolation necessary to ensure against the establishment of sneak paths around the oscillator. These transistors offer a low DC but a high AC impedance as viewed from their collector circuits. Further protection against a sneak path around the oscillator is afforded by the diode D1.

Figure 3:
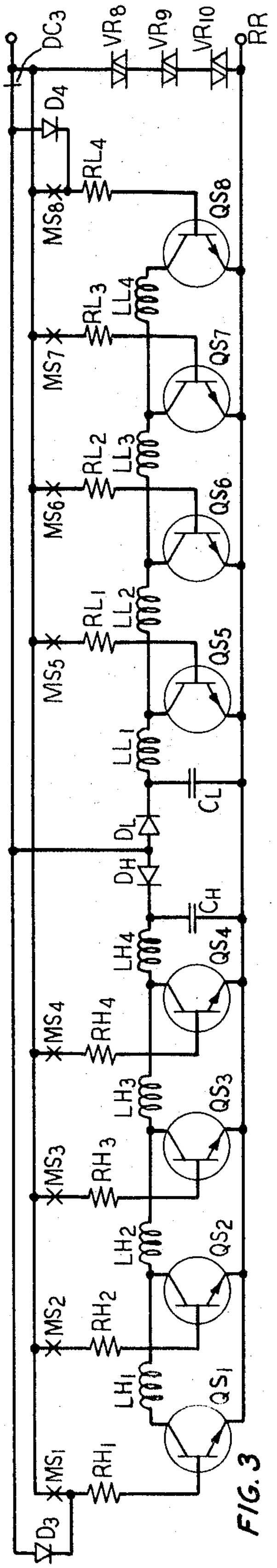
FIG. 3 is a schematic circuit diagram of an alternative form in accordance with the invention of the dial signal generator shown in FIG. 2.

In accordance with the invention, an alternative method of providing power to operate the transistor switches is illustrated by the circuit of FIG. 3. Varistors $VR_8$, $VR_9$ and $Vr_{10}$ are placed in series with the TIP lead of the telephone line and the voltage developed across these elements is employed to power the transistor switches $QS_1$ through $QS_8$. The terminal RR in the circuit of FIG. 3 corresponds to the terminal RR in FIG. 1 and thus, except for the particular arrangement of the tank circuits, the remainder of the oscillator circuit and the telephone network may be identical to that shown in FIG. 1.

In FIG. 3, the diodes D3 and D4 isolate the tank circuit during oscillator operation. The varistors $VR_8$, $VR_9$ and $Vr_{10}$ have a relatively low AC impedance, on the order of 2 ohms each for example, and thus do not affect the AC characteristics of the telephone loop.

It is to be understood that the embodiment described herein is merely illustrative of the principles of the invention. Various modifications thereto may be effected by persons skilled in the art without departing from the spirit and scope of the invention.

What is claimed is:

1. Oscillatory signal generating apparatus for a subscribers's telephone set comprising, in combination, an active oscillator circuit element, a feedback path for said element, a first and second group of tuned circuits connected in a mutual parallel relation, said groups being connectable in the feedback path of said element and being connectable across a telephone line, means for selectively connecting the combinations of one of said tuned circuits from said first group and one of said tuned circuits from said second group into said feedback paths thereby to enable the generation of a selected combination of oscillatory bursts, said last-named means comprising a plurality of pairs of switches, each of said pairs comprising a respective series combination of a respective mechanical switch and a respective solid-state switching device, each of said solid-state switching devices being operated in response to the operation of a corresponding one of said mechanical switches, whereby the quality of generated oscillatory signals is isolated from and unaffected by the distortion products associated with the operation of said mechanical switches, means for regulating the level of direct current passing through said solid-state switching devices, said regulating means comprising a first transistor having the collector electrode thereof connected to a common point of each of said tuned circuits in one of said groups, leaving the emitter electrode thereof connectable to one side of a telephone line by way of a resistive element, means including a varistor connecting the base of said last-named transistor to one side of said line and a resistive element connecting the base of said last-named transistor to the other side of said line.

2. Oscillatory signal generating apparatus for a subscribers's telephone set having line terminals comprising, in combination, a transistor oscillator connected across said terminals, first and second groups of tuned circuits connected in parallel relation in the feedback path of said transistor oscillator, a plurality of dual switch means in each of said groups for shorting out selected portions of said tuned circuits thereby to enable the generation of a selected pair of oscillatory signals each corresponding to a particular tuned circuit in a respective one of said groups, each of said dual switch means including a respective transistor leaving the collector emitter path thereof connected to permit the shorting out of selected portions of the tuned circuits in a corresponding one of said groups, each of said dual switch means further including a respective mechanical switch connected in the base circuit of a respective one of said transistors thereby to permit the application of base current to each of the transistors in said dual switch means, rendering said transistors conductive, said mechanical switches being operable by a pushbutton telephone dial, each of said groups of tuned circuits including a respective plurality of serially conducted inductive elements, said collector electrodes of said transistors being connected to respective terminals of said inductive elements, the free terminal of a terminal one of said inductive elements in each of said groups being connected to the collector electrode of a respective regulating transistor, means including a respective resistive element connecting the emitter electrode of each of said regulating transistors to a common one of said line terminals, means including a common resistive element connecting the base electrodes of each of said regulating transistors to one of said line terminals, and means including a serially connected diode and varistor connecting said last-named base electrodes to the other one of said line terminals.

3. Apparatus in accordance with claim 2 including an oscillator excitation switch comprising a mechanical contact of a dial common switch, and means including said last-named switch for providing excitation current to said oscillator only during the time interval between the closing of a set of said dual switch means and the opening of said excitation switch, said excitation switch operation being arranged to follow the operation of any one of said dual switch means.

4. In a subscribers's telephone set including a pair of line terminals, in combination, a speech network including a receiver connected across said line terminals, a conductive path extending from a terminal in the hybrid of said speech network and including, in serial relation, a first resistive element, a transmitter, first and second break contacts of a dial common switch, a first and a second group of tuned circuits in parallel relation, said tuned circuits having a common input point and respective output points, respective current regulating means each connecting a corresponding one of said output points to a common one of said line terminals, third current regulating means connecting a terminal in said second group of tuned circuits to said common one of said line terminals, a transistor oscillator including said tuned circuits connected across said line terminals, a plurality of dual switch means each adapted for selectively connecting a respective one of said tuned circuits to said oscillator thereby to initiate the generation of a corresponding tone signal, each of said dual switch means comprising a respective transistor and a respective mechanical switch, each of said transistors being rendered conductive by the operation of a corresponding one of said mechanical switches, said mechanical switches being operated by the pushbuttons of a pushbutton telephone dial.

5. Apparatus in accordance with claim 4 wherein each of said current regulating means comprises a respective transistor having a collector emitter path thereof connected between a respective one of said tuned circuits and said common one of said line terminals.

* * * * *